117,330

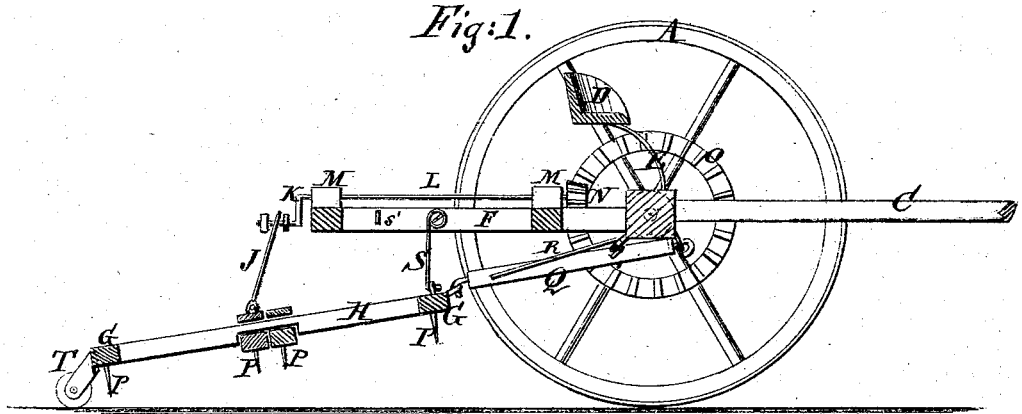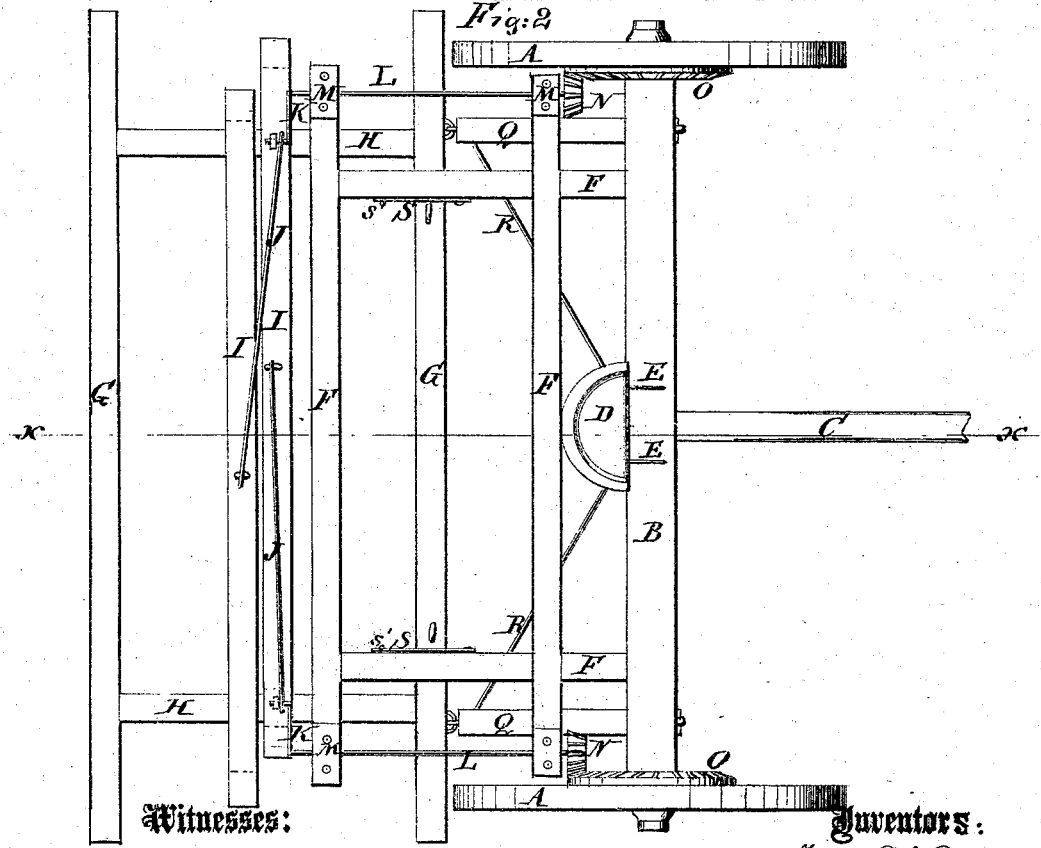

UNITED STATES PATENT OFFICE.

FREDERICK P. L. REIMERS AND HANS ASBAHR, OF DAVENPORT, IOWA.

IMPROVEMENT IN SULKY-HARROWS.

Specification forming part of Letters Patent No. 117,330, dated July 25, 1871.

*To all whom it may concern:*

Be it known that we, FREDERICK P. L. REIMERS and HANS ASBAHR, of Davenport, in the county of Scott and State of Iowa, have invented a new and useful Improvement in Sulky-Harrow; and we do hereby declare that the following is a full, clear, and exact description thereof, which will enable others skilled in the art to make and use the same, reference being had to the accompanying drawing forming part of this specification, in which—

Figure 1 is a detail sectional view of our improved harrow taken through the line $x\ x$, Fig. 2, and showing the harrow as adjusted for moving from place to place. Fig. 2 is a top view of the same adjusted for work.

Similar letters of reference indicate corresponding parts.

Our invention has for its object to furnish an improved sulky-harrow, simple in construction and effective in operation, and which may be easily and quickly adjusted for work or transportation; and it consists in the construction and arrangement of various parts of the machine, as hereinafter more fully described.

A are the sulky-wheels, which revolve upon the journals of the axle B. C is the tongue, the rear end of which is rigidly attached to the axle B. D is the driver's seat, the supports E of which are attached to the axle B. To the axle B is rigidly attached a rearwardly-projecting frame, F, for the purpose hereinafter set forth. G are the front and rear longitudinal bars of the harrow, which are securely and rigidly attached to the ends of the cross-bars H. The middle parts of the cross-bars H are notched or halved to pass through the slots in the two movable longitudinal bars I, so that the said bars I may have a longitudinal movement upon the said cross-bars H. To the middle parts of the movable bars I are pivoted the lower ends of the connecting-rods J, the upper ends of which are pivoted to the arms of the cranks K, where they are detachably secured in place by nuts screwed upon the ends of the said crank-arms. The cranks K are formed upon or attached to the rear ends of the rods or shafts L, which revolve in bearings or journal-boxes M attached to the ends of the frame F, and which have collars or shoulders formed upon them to keep them from longitudinal movement in said bearings. To the forward ends of the rods or shafts L are attached small gear-wheels N, the teeth of which mesh into the teeth of the gear-wheels O, formed upon or attached to the sulky-wheels A, so that the bars I may be moved back and forth longitudinally by the advance of the machine. P are the harrow-teeth, which are attached, at suitable distances apart, to the longitudinal bars G I. Q are the bars by which the harrow is drawn, the forward ends of which are pivoted, by hooks and eyebolts or other suitable means, to the axle B, and the rear ends of which are pivoted to the front horizontal bar G of the harrow by means of hooks and eyebolts or other suitable means. R are braces to hold the draw-bars Q from lateral movement, so that the harrow will be drawn forward squarely. The rear ends of the braces R are attached to the rear ends of the draw-bars Q, and their forward ends are pivoted to the axle B, so that, while holding the draw-bars Q against lateral movement, they will not interfere with the vertical movement of said bars, thus allowing the harrow to accommodate itself to the surface of the ground. To the side bars of the frame F are pivoted hooks S, which may be hooked into eyebolts or staples attached to the front cross-bar G of the harrow to support the forward part of the harrow away from the ground when passing from place to place. The rear part of the harrow may be supported away from the ground when passing from place to place by one or more wheels, T, the standards of which are slid into dovetailed grooves in the rear longitudinal bar G of the harrow, as shown in Fig. 1. The hooks S, when not required for use, may be hung upon hooks $s'$ attached to the side bars of the frame F.

We desire to be understood as not claiming to be the original inventors of a reciprocating toothed bar operated by a gear-connection with the wheels of a sulky-harrow; but

Having thus described our invention, we claim as new and desire to secure by Letters Patent—

The arrangement, with the rising and falling harrow G H connected with the axle by the bars Q Q, of the reversely-reciprocating toothed bars I I, operated by the rods J, crank-rods K L, and wheels N O, as shown and described, for the purpose specified.

FREDERICK P. L. REIMERS.
HANS ASBAHR.

Witnesses:
WILLIAM RUNYON,
JNO. W. GREEN.